United States Patent
Jones (10) Patent No.: US 7,401,569 B2
(45) Date of Patent: Jul. 22, 2008

(54) CLAMP ASSEMBLY FOR MOUNTING A BOAT CANOPY

(76) Inventor: Justin L. Jones, 1136 Crandall Ave., Salt Lake City, UT (US) 84106-2606

( * ) Notice: Subject to any disclaimer, the term of this patent is extended or adjusted under 35 U.S.C. 154(b) by 0 days.

(21) Appl. No.: 11/897,531

(22) Filed: Aug. 29, 2007

(65) Prior Publication Data

US 2008/0083099 A1    Apr. 10, 2008

Related U.S. Application Data

(63) Continuation of application No. 11/348,023, filed on Feb. 6, 2006, now abandoned.

(51) Int. Cl.
*B63B 17/00* (2006.01)
(52) U.S. Cl. ................ 114/361; 403/110
(58) Field of Classification Search .......... 114/361, 114/364; 24/457, 458; 403/3, 73, 79, 110, 403/218, 219
See application file for complete search history.

(56) References Cited

U.S. PATENT DOCUMENTS

| | | | |
|---|---|---|---|
| 1,522,751 A | 1/1925 | Schler | |
| 1,710,693 A | 4/1929 | Armstrong | |
| 2,575,917 A | 11/1951 | Johnson | |
| 2,754,156 A | 7/1956 | Elderkin | |
| 3,503,580 A | 3/1970 | Levy | |
| 4,219,285 A | 8/1980 | Hayashi | |
| 4,381,636 A | 5/1983 | Sapp | |
| 4,529,331 A * | 7/1985 | Schwartz | 403/73 |
| 4,566,819 A | 1/1986 | Johnston | |
| 4,580,922 A | 4/1986 | Coppa | |
| 4,613,249 A * | 9/1986 | Schwartz | 403/3 |
| 4,936,550 A | 6/1990 | Wickham et al. | |
| 4,957,251 A | 9/1990 | Hubbard | |
| 5,088,672 A | 2/1992 | Neuendorf et al. | |
| 5,167,466 A | 12/1992 | Hsieh | |
| 5,364,154 A | 11/1994 | Kaiser | |
| 5,428,913 A | 7/1995 | Hillstrom | |
| 5,520,139 A | 5/1996 | King | |
| 5,662,063 A * | 9/1997 | Seijas | 114/361 |
| 5,895,024 A | 4/1999 | Williams et al. | |
| D409,972 S | 5/1999 | Todd | |
| 5,983,589 A | 11/1999 | Daudet | |
| 5,988,077 A | 11/1999 | Balderi | |
| 6,045,103 A | 4/2000 | Costa et al. | |
| 6,138,345 A | 10/2000 | Suzuki et al. | |
| 6,273,377 B1 | 8/2001 | Archer | |
| 6,709,184 B1 | 3/2004 | McDonald | |
| 6,786,302 B2 | 9/2004 | Liew et al. | |
| 2005/0186029 A1 | 8/2005 | Jones | |

\* cited by examiner

*Primary Examiner*—Lars A Olson
(74) *Attorney, Agent, or Firm*—Clayton, Howarth & Cannon, P.C.

(57) ABSTRACT

A boat canopy mounting system having a front mounting assembly and a rear mounting assembly. The mounting system is able to secure boat canopies and other tops or sunshades to boat towers. The mounting system is further able to be employed on boat towers of varying configurations without any modifications. To accomplish this feature, the rear mounting assembly may include a plurality of clamp mounting locations such that an installer may selectively choose the clamp mounting locations to accommodate boat towers of varying design.

12 Claims, 6 Drawing Sheets

FIG. 13

CLAMP ASSEMBLY FOR MOUNTING A BOAT CANOPY

CROSS-REFERENCE TO RELATED APPLICATIONS

This application is a continuation of U.S. patent application Ser. No. 11/348,023, filed Feb. 6, 2006 now abandoned, entitled CLAMP ASSEMBLY FOR MOUNTING A BOAT CANOPY, which is hereby incorporated by reference herein in its entirety.

STATEMENT REGARDING FEDERALLY SPONSORED RESEARCH OR DEVELOPMENT

Not Applicable.

BACKGROUND

1. The Field of the Invention

The present disclosure relates generally to mounting systems for canopies, biminis, sunshades and tops for boats and other vehicles.

2. Description of Related Art

In order to create a shelter on a boat, most consumers purchase a bimini top and mount it to the gunwales of the boat. U.S. Pat. No. 5,520,139 to King 1996 shows a typical bimini top used for ski boats. A bimini top is a form of a sunshade with 2 to 4 inverted U-shaped bows held together with hinges to create a collapsible frame work that supports material for shelter.

In the past most, ski ropes have been typically attached to the transom of the boat or to a ski pylori located in the center of the boat. The rope has been generally located about one to two feet above the water surface while pulling a skier. With the popularity of wake boarding and the desire to enhance water sports performance, boat manufactures now mount a metal framework, called a tower, to the gunwales of the boat. The tower extends upwards at an angle to create a mounting point for the rope that is relatively centered over the boat and that is about six to eight feet above the water surface thus enhancing an upward pull for the person being towed. U.S. Pat. Des. 409,972 to Todd 1999 shows a typical tower used for towing water sports activities. The framework of a typical tower consequently interferes with the framework of a traditional bimini top thus rendering it useless. Further, because of the different designs of boat towers, it is difficult to utilize the same mounting hardware on each installation. It would therefore be an improvement over the previously available mounting systems to provide a system for mounting boat canopies to towers that is able to accommodate towers of varying design.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The framework of a boat wakeboard tower interferes with the framework of a traditional boat canopy, thus rendering the two essentially incompatible. The present invention solves this problem by creating a canopy or top, such as a folding canopy top (FCT), mounted to the boat tower by the novel apparatus defined herein. One previous way to fasten a canopy to the tower was to drill holes through the frame of the tower and the framework of the canopy and then use bolts and removable pins to hold the canopy in place. This approach has several disadvantages. First, the structural integrity of the tower and canopy framework is severely compromised by drilling holes in them. Canopies mounted in this manner are also difficult for consumers and professionals to install. Further, it is difficult to drill and align holes so that the canopy functions and fits properly. Second, there is no adjustment once the holes have been drilled. Third, the thin wall tubing of the tower allows the holes to wear down from the vibration of the boat and any pins or fasteners can eventually fall out or become loose. Next, the bolting method does not have the ability to provide the proper structural strength when filling the gap between the two frameworks. Fifth, it is impossible to remove the canopy from the tower without permanent holes/ damage to the tower. Finally, the overall appearance of the craftsmanship looks substandard. The present invention eliminates the short comings of the prior art described above.

Figure 1:
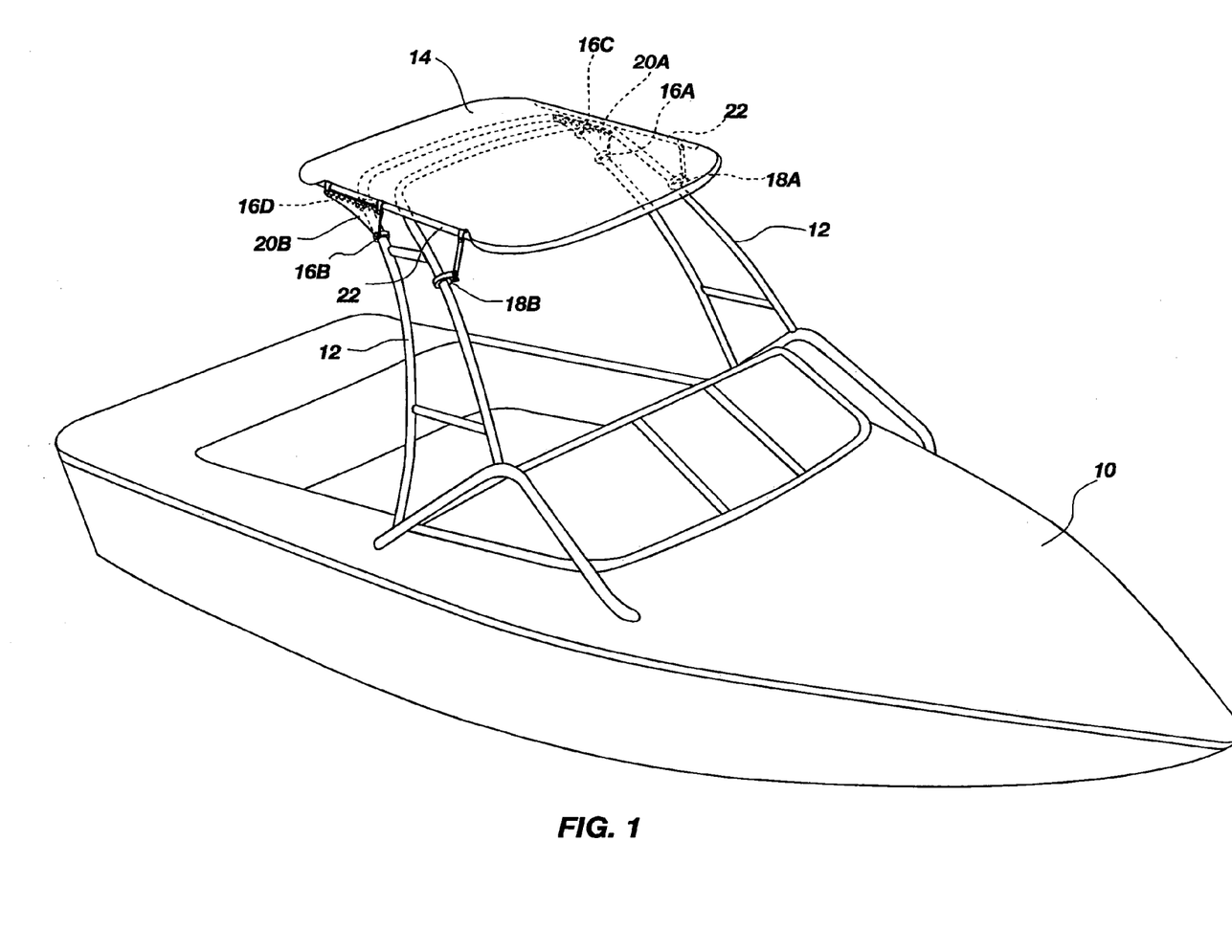
FIG. 1 is a perspective view of a boat with a tower having a canopy mounted using a front mounting assembly and a rear mounting assembly in accordance with one embodiment of the present invention.

FIG. 1 illustrates a perspective view of a boat 10 with a tower 12 mounted thereon in the conventional fashion. FIG. 1 further shows a boat canopy 14 secured to the boat tower 12 with round clamps 16A-16D, fork clamps 18A and 18B, and a pair of mounting plates 20A and 20B. The mounting plates 20A and 20B are each secured on opposing sides of the tower 12 to the trailing posts of the tower 12 by the round clamps 16A-16D as shown in FIG. 1. The fork clamps 18A and 18B are each secured on opposing sides of the tower 12 to the leading posts of the tower 12 as is also shown in FIG. 1. A framework 22 of the boat canopy 14 is in turn secured to the mounting plates 20A and 20B and the fork clamps 18A and 18B in a fashion that will be described hereinafter. As observed in FIG. 1, the boat canopy 14 is mounted above the tower 12 in a substantially horizontal position.

Figure 2:
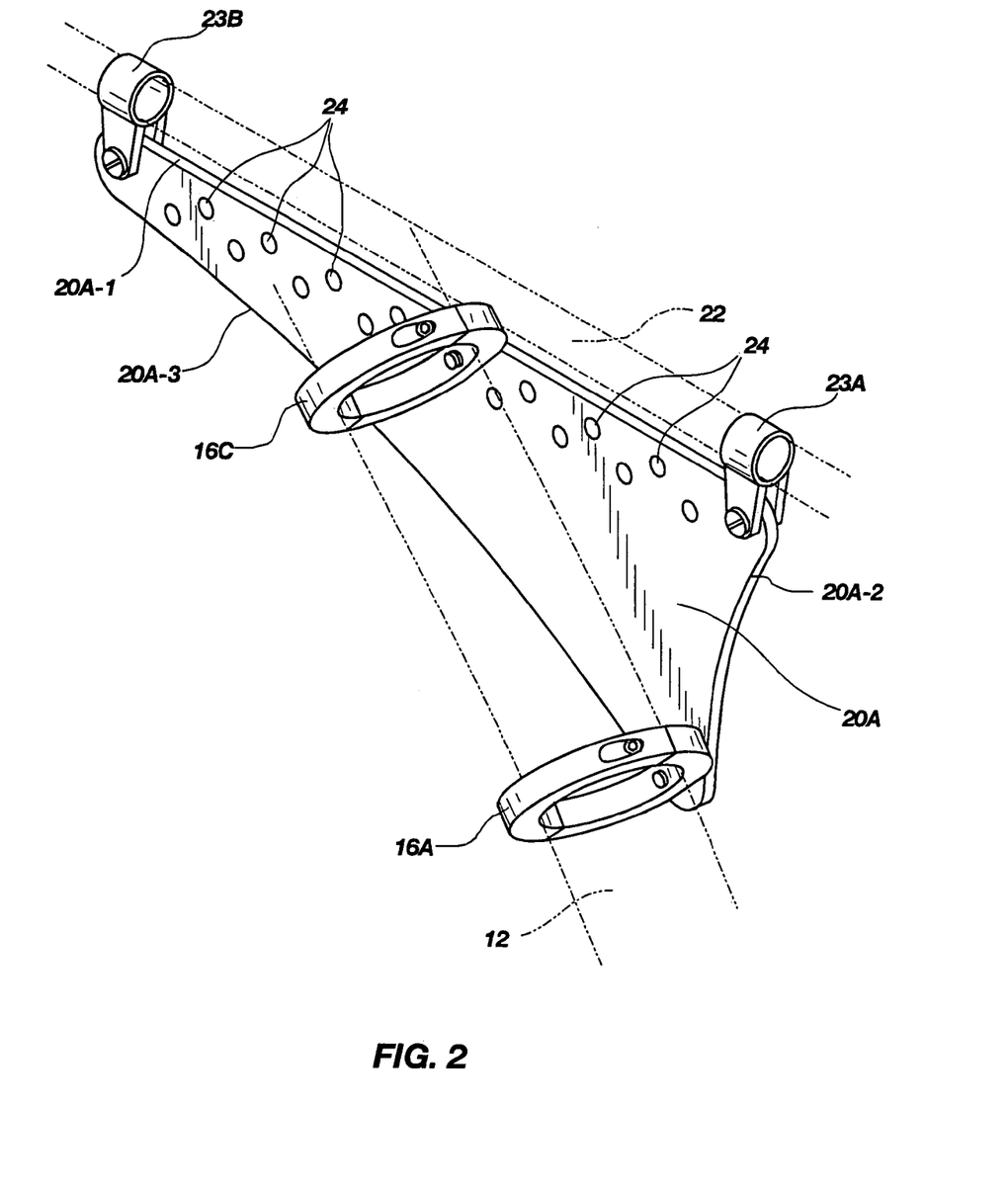
FIG. 2 illustrates a close-up of the rear mounting assembly shown in FIG. 1.

FIG. 2 illustrates a perspective view of the round clamps 16A and 16C secured to the mounting plate 20A, which operate collectively to secure the framework 22 of the boat canopy 14 to a trailing post of the tower framework 12. As observed in FIG. 2, the mounting plate 20A is substantially triangular in shape, and comprises a top edge 20A-1, a leading edge 20A-2, and a bottom edge 20A-3. Disposed adjacent to the top edge 20A-1 are two offset rows of mounting holes 24 extending horizontally across the mounting plate 20A. The round clamp 16C is secured to one of the mounting holes 24. The round clamp 16A is secured to the mounting plate 20A proximate the junction of the leading edge 20A-2 and the bottom edge 20A-3. Both of the round clamps 16A and 16C are clamped onto the trailing post of the boat tower 12. Clamps 23A and 23B, secure the framework of the boat canopy 14 to the mounting plate 20A.

Figure 3:
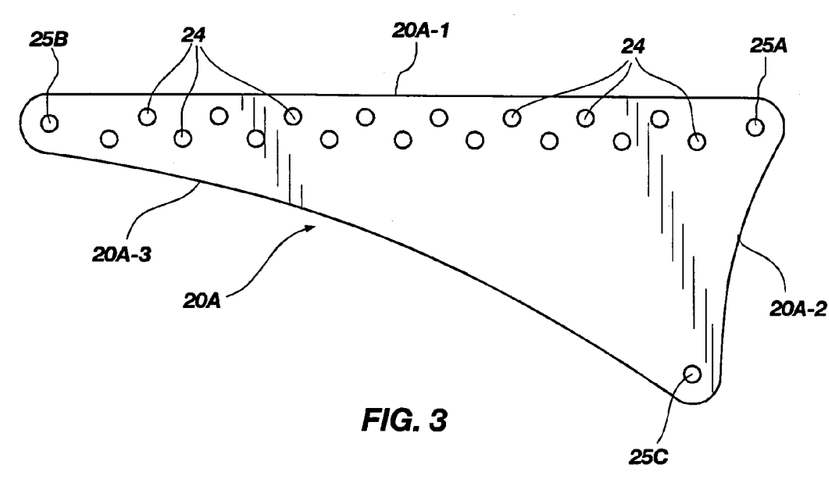
FIG. 3 is a side view of a mounting plate of the rear mounting assembly.

FIG. 3 illustrates a side view of the mounting plate 20A. The mounting holes 24 are arranged in a manner to allow various mounting positions for the round clamp 16C. The various mounting positions allow the mounting plate 20A to universally fit a wide range of boat towers 12 of different designs. A mounting hole 25A is located proximate the junction of the top edge 20A-1 and the leading edge 20A-2. A mounting hole 25B is located proximate the junction of the top edge 20A-1 and the bottom edge 20A-3. A mounting hole 25C is located proximate the junction of the leading edge 20A-2 and the bottom edge 20A-3. The mounting holes 25A and 25B facilitate securing the clamps 23A and 23B, respectively, to the mounting plate 20A and the mounting hole 25C facilitates securing the round clamp 16A to the mounting plate 20A as shown in FIG. 2.

Figure 4:
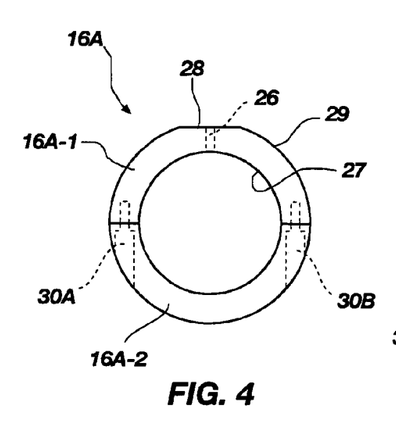
FIG. 4 is a side view of a clamp for use with the rear mounting assembly.

FIG. 4 illustrates a side view of the round clamp 16A with a plate mounting hole 26, plate mounting base 28 and clamp mounting holes 30A and 30B. As can be observed in FIG. 4, the round clamp 16A is substantially circular in shape when viewed from the side. The round clamp 16A further comprises an inner surface 27 adapted to engage a post on the boat tower 12. The round clamp 28 includes an outer surface 29. As can be observed in FIG. 4, the round clamp 16A is formed from two semi-circular pieces 16A-1 and 16A-2. The clamp mounting holes 30A and 30B extend from the outer surface 29 on the piece 16A-2 and into the piece 16A-1. The clamp mounting holes 30A and 30B may include counter-bores as shown in FIG. 4 to allow a fastener, such as a screw or a bolt, to sit flush with or below the outer surface 29 when it is installed into one of the mounting holes 30A and 30B. The plate mounting hole 26, located in the plate mounting base 28, extends from the outer surface 29 to the inner surface 27 of the round clamp 16A. In particular, both the plate mounting hole 26 and the plate mounting base 28 are disposed on the piece 16A-1.

Figure 5:
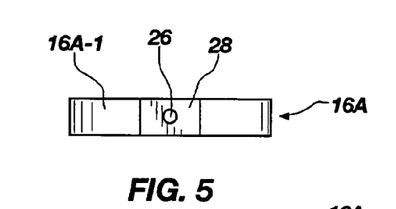
FIG. 5 is a top view of the clamp depicted in FIG. 4.
Figure 6:
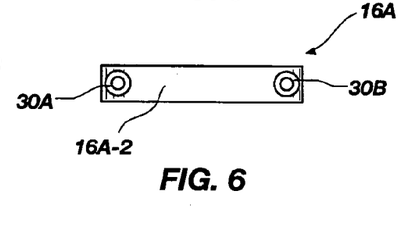
FIG. 6 is a bottom view of the clamp depicted in FIG. 4.

FIG. 5 illustrates a top view of the round clamp 16A. The plate mounting hole 26 is located at approximately the center of the plate mounting base 28. As can be observed in FIGS. 4 and 5, the plate mounting base 28;

FIG. 6 illustrates a bottom view of the piece 16A-2 of the round clamp 16A. The clamp mounting holes 30A and 30B are located at opposing ends of the piece 16A-2.

Figure 7:
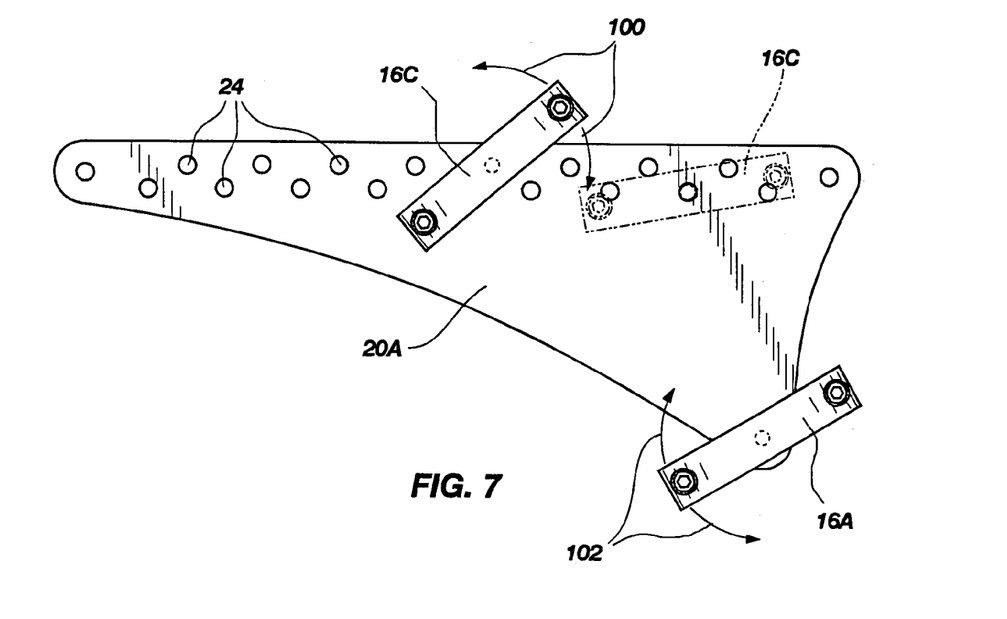
FIG. 7 illustrates two clamps of the type shown in FIG. 4 mounted to the mounting plate shown in FIG. 3.

FIG. 7 illustrates a side view of the mounting plate 20A and shows some of the features of the present invention. The round clamp 16C is mountable in any of the mounting holes 24. The round clamp 16C is shown mounted in one of the mounting holes 24. In addition, a second round clamp 16C is shown in phantom lines to illustrate that the positioning of the round clamp 16C is adjustable via the mounting holes 24 to thereby accommodate boat towers 12 of varying designs. Further, as shown in FIG. 7, the round clamp 16C is selectively rotatable in the mounting holes 24 as demonstrated by the arrows 100, to thereby accommodate boat towers 12 of varying designs. The arrows 100 illustrate and represent the rotational movement of the round clamp 16C in the mounting holes 24. The round clamp 16A is shown mounted in the hole 25C (see FIG. 3). The round clamp 16A is selectively rotatable in the mounting hole 25C as demonstrated by the arrows 102, to thereby accommodate boat towers 12 of varying designs.

Figure 8:
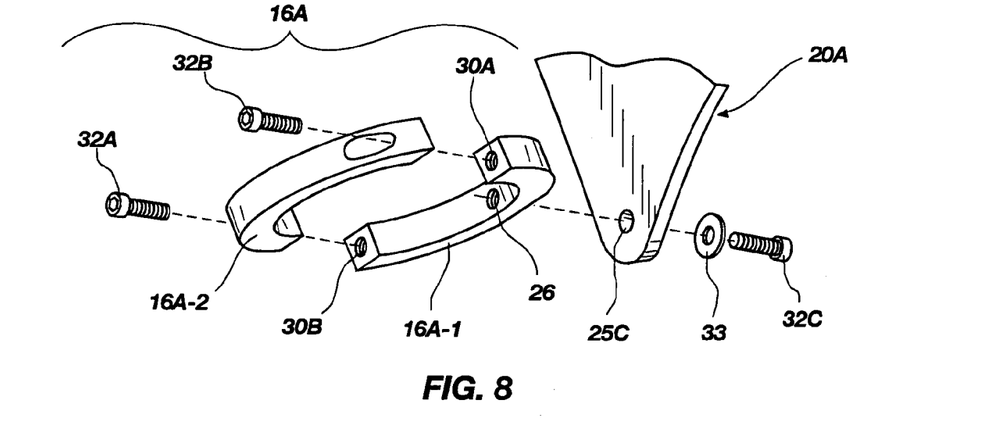
FIG. 8 is an exploded view of a clamp and mounting plate.

FIG. 8 illustrates an exploded view of the mounting plate 20A and the round clamp 16A, as they are assembled together. The round clamp 16A is secured with a fastening device 32C, such as a bolt, to the mounting plate 20A. The fastening device 32C passes through the hole 25C in the mounting plate 20A to thereby engage an inner surface of the plate mounting hole 26. In one embodiment, the engagement between the fastening device 32C and the inner surface of the plate mounting hole 26 is a threaded engagement. The two semi-circular pieces 16A-1 and 16A-2 of the round clamp 16A are secured together by fastening devices 32A and 32B, which may be bolts. The fastening devices 32A and 32B may engage inner surfaces of the clamp mounting holes 30B and 30A, respectively. The engagement between the fastening devices 32A and 32B with the inner surfaces of the clamp mounting holes 30B and 30A, respectively, may be by threaded engagement. A washer 33 may also be used between the fastener 32C and the mounting plate 20A as shown in FIG. 8.

Figure 9:
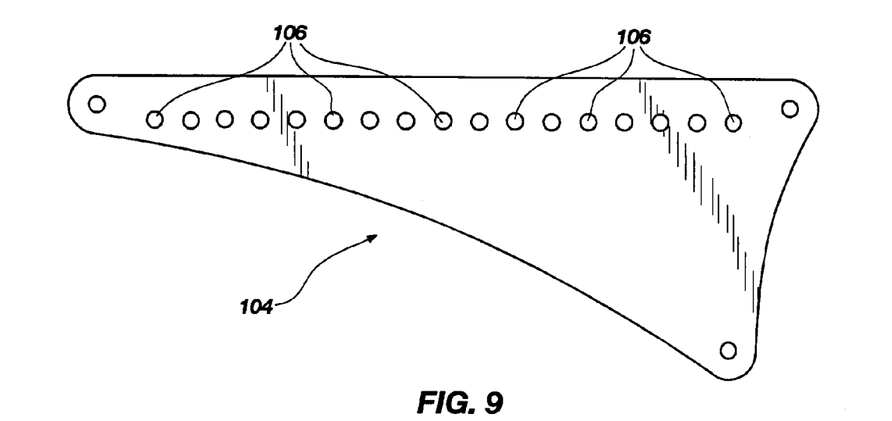
FIG. 9 is an alternative embodiment of a mounting plate.

FIG. 9 illustrates a side view of an alternative embodiment of a mounting plate 104. In this embodiment, the mounting holes 106 are shown in a single straight row.

It will be appreciated that the design of the mounting plate 20B and round clamps 16B and 16D may be the same as described above.

Figure 10:
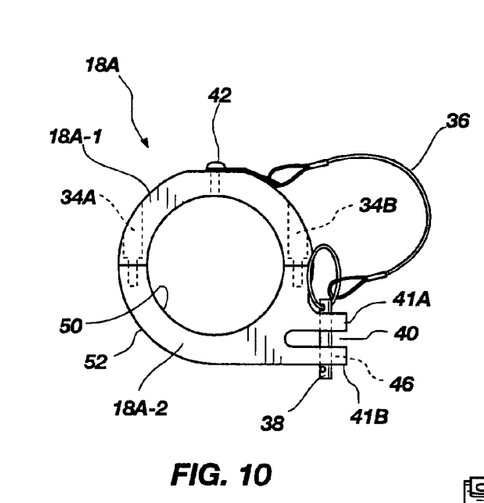
FIG. 10 is a side view of a fork clamp.

FIG. 10 illustrates a side view of the fork clamp 18A. The fork clamp 18A is comprised of two semi-circular pieces 18A-1 and 18A-2. The fork clamp 18A further comprises an inner surface 50 and an outer surface 52. The inner surface 50 of the fork clamp 18A is adapted to engage a post of the boat tower 12. Holes 34A and 34B extend from the outer surface 52 of the piece 18A-1 and into the piece 18A-2. The holes 34A and 34B may include counter-bores as shown in FIG. 10 to allow fasteners, such as screws or bolts, to sit flush with or below the outer surface 52 when they are installed into the holes 34A and 34B. The fork clamp 18A further comprises two members 41A and 41B that define a slot 40. The members 41A and 41B extend outwardly and parallel from the piece 18A-2. A hole 46 extends through each of the extended members 41A and 41B. The hole 46 is adapted to receive a fastening device 38, such as a pin. When installed into the hole 46, the fastening device 38 extends through the slot 40 as shown in FIG. 10. A lanyard 36 is used to retain the fastening device 38 in proximity to the fork clamp 18A. One end of the lanyard 36 is attached to the fastening device 38 while the other end is secured to piece 18A-1 via a small tab secured by a fastener 42.

Figure 11:
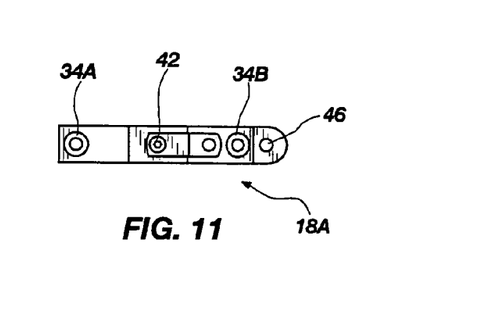
FIG. 11 is a top view of the fork clamp shown in FIG. 10.

FIG. 11 illustrates a top view of the fork clamp 18A. Fastening holes 34A and 34B are disposed on opposing ends of piece 18A-1. The small tab is fastened to the clamp 18A with the fastener 42.

Figure 12:
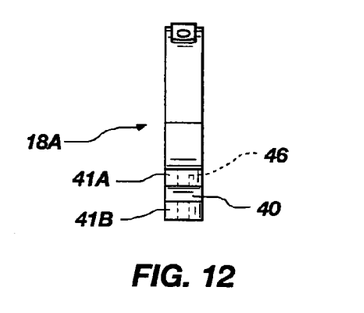
FIG. 12 is another side view of the fork clamp shown in FIG. 10.

FIG. 12 illustrates an end view of the fork clamp 18A. The slot 40 is defined by members 41A and 41B. The hole 46 extends through members 41A and 41B.

Figure 13:
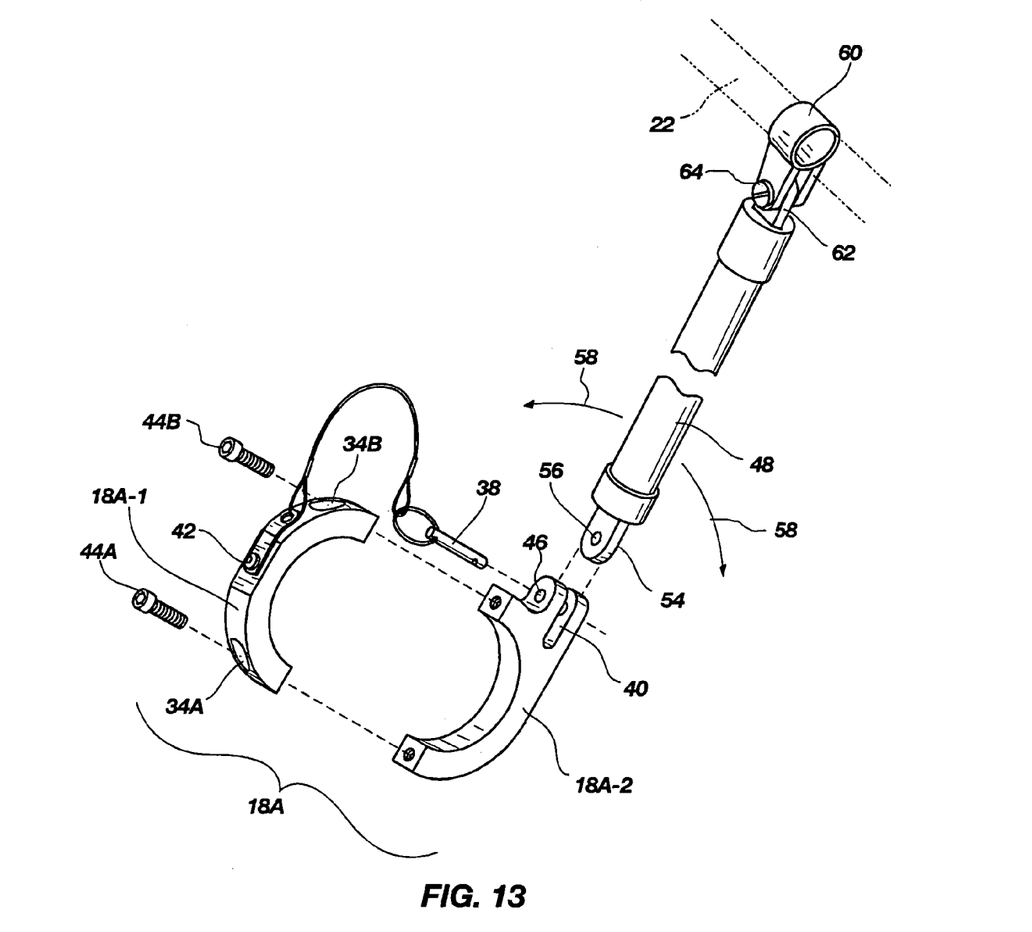
FIG. 13 is an exploded view of the front mounting assembly shown in FIG. 1.

FIG. 13 illustrates an exploded view of the fork clamp 18A. Fasteners 44A and 44B are inserted through holes 34A and 34B, respectively, to thereby engage an inner surface of holes 34A and 34B, in the piece 18A-2. The engagement between the fasteners 44A and 44B with the inner surfaces of the holes 34A and 34B, respectively, may be by threaded engagement. A support 48 may be disposed between the framework 22 of the top 14 and the fork clamp 18A. A tab 54 disposed on the end of the support 48 may be inserted into the slot 40. The tab 54 may include a hole 56 that aligns with hole 46, when the tab 54 is installed in slot 40. With the tab 54 installed into the slot 40, the fastening device 38 can be inserted through the holes 46 and 56 to thereby secure the tab 54 and the support 48 to the fork clamp 18A. The support 48 may pivot forwards and backwards as shown by the arrows 58 in FIG. 13. The top of the support 48 is secured to the framework 22 of the boat canopy 14 via a clamp 60. Clamp 60 is in turn secured to a tab 62 extending from the top of the support 48 by a fastener 64.

It should be noted that as used herein and in the claims which appear below, that the term "boat canopy" refers to boat canopies, bimini tops, sunshades and any other tops designed to protect the occupants of a boat from inclement weather and the sun.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for providing shade in conjunction with a boat tower, the apparatus comprising:
    a boat canopy having a framework;
    a mounting plate;
    a first and second clamps coupled to the mounting plate, the first and second clamps each adapted to secure the mounting plate to the boat tower; and
    a third clamp and a fourth clamp coupled to the mounting plate, each of the third and fourth clamps adapted to secure the framework of the boat canopy to the mounting plate.

2. The apparatus of claim 1 wherein the mounting plate is substantially triangular in shape.

3. The apparatus of claim 1 wherein the mounting plate further comprises a plurality of clamp mounting locations.

4. The apparatus of claim 3 wherein the plurality of plurality of clamp mounting locations comprises a row of holes extending approximately from a front portion of the mounting plate to a rear portion of the mounting plate.

5. The apparatus of claim 4 wherein the first clamp is selectively coupled to any one of the plurality of holes with a fastener such that the orientation between the first clamp and the second clamp is variable to thereby accommodate boat towers of varying design.

6. The apparatus of claim 5 wherein the first and second clamps are both rotatably coupled to the mounting plate.

7. The apparatus of claim 1 wherein at least one of the first and second clamps is comprised of two semi-circular pieces, each of the two semi-circular pieces having an inner surface for engaging the boat tower.

8. An apparatus for providing shade in conjunction with boat towers of varying design, said apparatus comprising:
    a boat canopy having a framework;
    a mounting plate;
    a plurality of clamp mounting locations formed on the mounting plate, the plurality of clamp mounting locations grouped into a first group and a second group;
    a first clamp, the first clamp having an inner surface and an outer surface, the inner surface of the first clamp being adapted to engage the boat tower;
    a second clamp, the second clamp having an inner surface and an outer surface, the inner surface of the second clamp adapted to engage the boat tower;
    a first fastener for rotatably mounting the first clamp to the mounting plate at any one of the plurality of mounting locations of the first group; and
    a second fastener for rotatably mounting the second clamp to the mounting plate at any one of the plurality of mounting locations of the second group;
    wherein the orientation between the first clamp and the second clamp is variable to thereby accommodate boat towers of varying design.

9. The apparatus of claim 8 further comprising:
    a third and fourth clamps, each of the third and fourth clamps adapted to engage the framework of the boat canopy; and
    a pair of fasteners for mounting the third and the fourth clamps to the mounting plate.

10. The apparatus of claim 8 wherein the plurality of mounting locations of the first group comprises a row of individual mounting locations extending laterally from a front portion of the mounting plate to a rear portion of the mounting plate.

11. The apparatus of claim 8 wherein the first and second clamps each comprise two semi-circular pieces coupled together via a pair of fasteners; the first and second clamps each further comprising a flat mounting base for engaging a flat surface of the mounting plate.

12. An apparatus for providing shade in conjunction with a boat tower, said apparatus comprising:
    a boat canopy having framework, said framework having two sides, each of the sides having a front portion and a back portion;

a pair of rear mounting assemblies, each of the rear mounting assemblies operable to secure one side of the back portion of the framework of the boat canopy to the boat tower, each of the rear mounting assemblies comprising: a mounting plate, the mounting plate having a first clamp mounting location and a second clamp mounting location, said first clamp mounting location comprising a plurality of individual mounting locations arranged in a row, a first clamp selectively mountable to the mounting plate at any one of the individual mounting locations of the first clamp mounting location and a second clamp mountable to the mounting plate at the second clamp mounting location, the first and second clamps operable to secure the mounting plate to the boat tower, a third clamp mounting location and a fourth clamp mounting location, and a third and fourth clamps, the third and fourth clamps mountable to the mounting plate at the third clamp mounting location and the fourth clamp mounting location, respectively, the third and fourth clamps each operable to secure the framework of the boat canopy to the mounting plate; and a pair of front mounting assemblies, each of the front mounting assemblies operable to secure one side of the front portion of the framework of the boat canopy to the boat tower, each of the front mounting assemblies comprising: a fifth clamp, the fifth clamp having a clamping portion for receiving a portion of the boat tower, a sixth clamp having a clamping portion for receiving a portion of the framework, and an elongated support member, said support member extending between the fifth and sixth clamps.

* * * * *